United States Patent
Nyquist et al.

(10) Patent No.: US 9,797,510 B2
(45) Date of Patent: Oct. 24, 2017

(54) ROTATIONAL COUPLING DEVICE FOR BIMODAL SELECTIVE OUTPUT

(71) Applicant: Warner Electric Technology LLC, Braintree, MA (US)

(72) Inventors: Stephen Edward Nyquist, Simsbury, CT (US); Paul A. Larson, Belvidere, IL (US)

(73) Assignee: Warner Electric Technology LLC, Braintree, MA (US)

( * ) Notice: Subject to any disclaimer, the term of this patent is extended or adjusted under 35 U.S.C. 154(b) by 193 days.

(21) Appl. No.: 14/540,496

(22) Filed: Nov. 13, 2014

(65) Prior Publication Data
US 2016/0138712 A1    May 19, 2016

(51) Int. Cl.
*F16D 27/10*     (2006.01)
*F16D 27/11*     (2006.01)
(Continued)

(52) U.S. Cl.
CPC ......... *F16H 63/3043* (2013.01); *F16D 13/76* (2013.01); *F16D 21/04* (2013.01);
(Continued)

(58) Field of Classification Search
CPC .................................................... F16D 27/11
See application file for complete search history.

(56) References Cited

U.S. PATENT DOCUMENTS 378,088 A     2/1888    Foote
3,394,787 A *    7/1968    Fitzgerald ............. F16D 13/757
                                                                                    188/196 R
(Continued)

FOREIGN PATENT DOCUMENTS

DE    1187866 B    2/1965
DE    1575907 A1    1/1970
(Continued)

OTHER PUBLICATIONS

International Search Report issued in corresponding application PCT/US2015/052917 (Apr. 4, 2016).
(Continued)

*Primary Examiner* — Robert A Siconolfi
*Assistant Examiner* — Ryan Dodd
(74) *Attorney, Agent, or Firm* — Reising Ethington P.C.

(57) ABSTRACT

A rotational coupling device drives an output synchronous with either of two inputs. The device includes a hub disposed about an axis and an output member supported on the hub for rotation about the axis. First and second input members disposed about the hub are configured to rotate in first and second rotational directions and at first and second speeds, respectively, with at least one of the directions and speeds differing. A clutch member is disposed axially between the input members and coupled to the output member. An electromagnet is on an opposite side of the second input member relative to the clutch member. When the electromagnet is deenergized, the clutch member engages the first input member and the output member rotates with the first input member. When the electromagnet is energized, the clutch member engages the second input member and the output member rotates with the second input member.

27 Claims, 1 Drawing Sheet

(51) Int. Cl.
*F16H 63/30* (2006.01)
*F16D 13/76* (2006.01)
*F16D 27/04* (2006.01)
*F16D 21/04* (2006.01)
*F16D 27/108* (2006.01)
*F16D 27/112* (2006.01)
*F16D 27/12* (2006.01)

(52) U.S. Cl.
CPC ........... *F16D 27/04* (2013.01); *F16D 27/108* (2013.01); *F16D 27/11* (2013.01); *F16D 27/112* (2013.01); *F16D 27/12* (2013.01); *F16H 2063/3046* (2013.01)

(56) References Cited

U.S. PATENT DOCUMENTS

| | | | | |
|---|---|---|---|---|
| 3,624,767 A | * | 11/1971 | Kroeger | F16D 27/06 188/196 P |
| 3,679,034 A | * | 7/1972 | Miller | F16D 27/11 188/71.8 |
| 3,842,378 A | * | 10/1974 | Pierce | F04B 35/00 192/48.2 |
| 3,917,042 A | * | 11/1975 | Summa | B23Q 16/08 192/108 |
| 4,187,939 A | * | 2/1980 | Silvestrini | F16D 27/112 192/30 V |
| 5,036,964 A | * | 8/1991 | Booth | F16D 27/112 192/109 R |
| 5,396,976 A | * | 3/1995 | Koitabashi | F16D 27/112 192/112 |
| 5,404,980 A | * | 4/1995 | Shafer | F16D 27/112 192/109 R |
| 5,967,282 A | * | 10/1999 | Takahashi | F16D 27/112 192/84.961 |
| 7,144,225 B2 | * | 12/2006 | Boffelli | F01P 5/12 417/223 |
| 8,267,236 B2 | * | 9/2012 | Yoshida | F16D 27/112 192/200 |
| 8,319,696 B2 | | 11/2012 | Clayton et al. | |
| 2006/0154763 A1 | | 7/2006 | Serkh | |

FOREIGN PATENT DOCUMENTS

| | | | |
|---|---|---|---|
| DE | 3915065 A1 | 11/1989 | |
| DE | 19951631 A1 | 5/2001 | |
| DE | WO01/31218 | * 5/2001 | ............ F16D 21/112 |
| EP | 0093045 A1 | 11/1983 | |
| JP | 1994-179410 A | 6/1994 | |
| JP | 2009-092046 A | 4/2009 | |

OTHER PUBLICATIONS

Written Opinion issued in corresponding application PCT/US2015/052917 (Apr. 4, 2016).
English Language Abstract of Japanese Publication No. 1994-179410.
English Language Abstract of Japanese Publication No. 2009-092046.
Machine Translation (from Japanese Patent Office website) of Japanese Publication No. 1994-179410.
Machine Translation (from Japanese Patent Office website) of Japanese Publication No. 2009-092046.

* cited by examiner

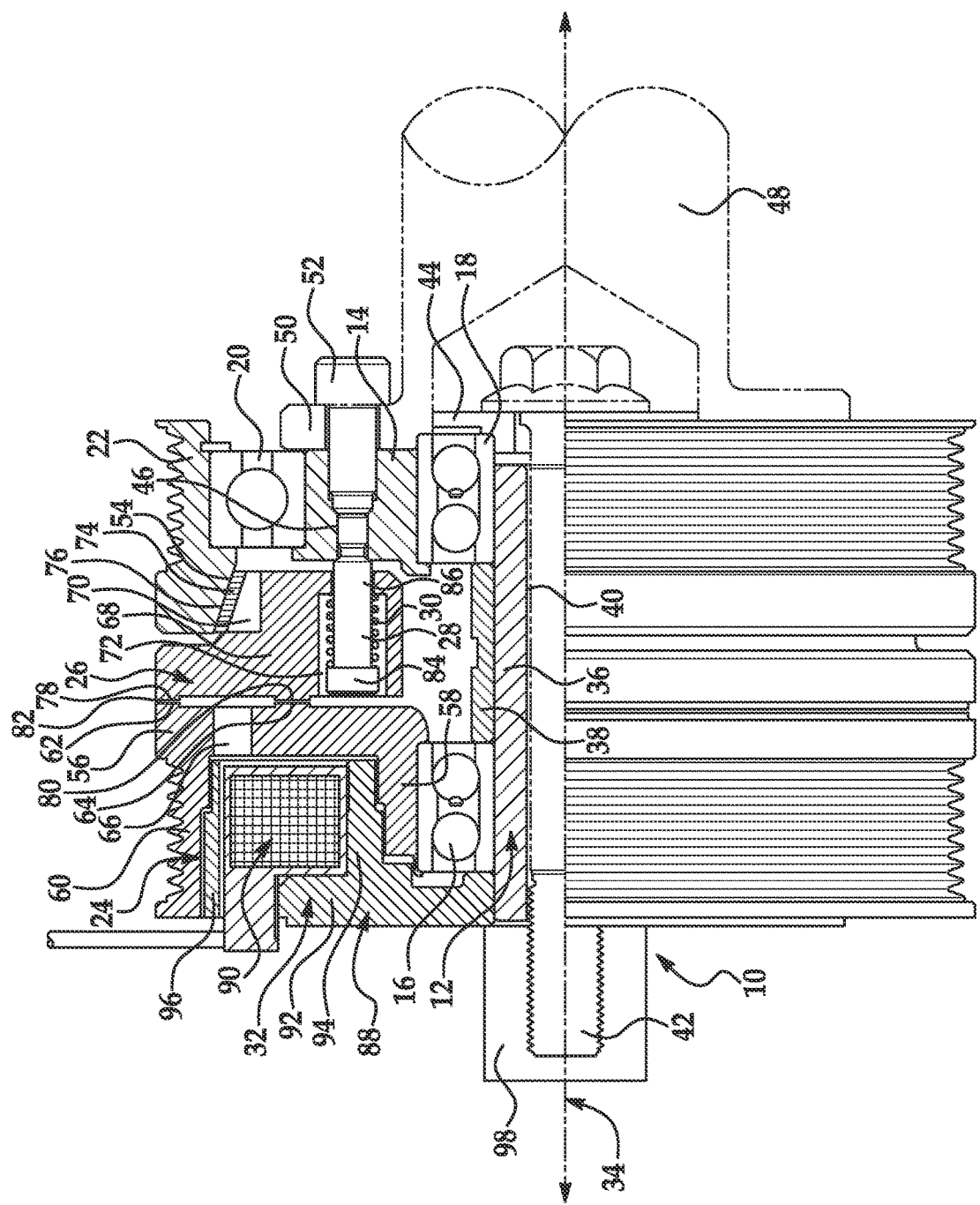

ROTATIONAL COUPLING DEVICE FOR BIMODAL SELECTIVE OUTPUT

BACKGROUND OF THE INVENTION a. Field of the Invention

This disclosure relates to a rotational coupling device. In particular, the disclosure relates to a rotational coupling device that enables transfer of torque to an output member from either of two input members to drive the output member in different rotational directions and/or at different speeds.

b. Background Art

Rotational coupling devices such as clutches and brakes are used to control transfer of torque between rotational bodies. One conventional application for a rotational coupling device is the transfer of a driving torque to a fan used in cooling a vehicle or another apparatus. For example, puller fans are often used to pull cooler air through a vehicle's radiator to assist in cooling components of the vehicle. By reversing the direction of rotation of the fan, the same fan can also be used to expel heat from the vehicle and/or to expel contaminants (e.g., plant debris) from the vehicle's radiator. Conventional rotational coupling devices used with cooling fans are only capable of transferring rotational torque to drive the fan in one rotational direction. Reversing the direction of the fan therefore requires a separate structure such as a motor. Another conventional application for a rotational coupling device is to transfer a driving torque from a vehicle engine to an alternator or other vehicle accessory. It is desirable, however, to be able to drive the alternator or other accessories at different speeds (e.g., at a higher speed when the vehicle is idling and at a lower speed when the vehicle is in motion) and many conventional rotational coupling devices are only capable of driving the alternator or accessory at one speed.

The inventors herein have recognized a need for a rotational coupling device that will minimize and/or eliminate one or more of the above-identified deficiencies.

BRIEF SUMMARY OF THE INVENTION

This disclosure relates to a rotational coupling device. In particular, the disclosure relates to a rotational coupling device that enables transfer of torque to an output member from either of two input members to drive the output member in different rotational directions and/or at different speeds.

A rotational coupling device in accordance with one embodiment of the invention includes a hub disposed about an axis and an output member supported on the hub for rotation relative to the hub about the axis. The device further includes a first input member disposed about the hub and configured to rotate relative to the hub in a first rotational direction and at a first speed. The device further includes a second input member disposed about the hub and configured to rotate relative to the hub in a second rotational direction and at a second speed. At least one of the second rotational direction and the second speed is different from a corresponding one of the first rotational direction and the first speed. The device further includes a clutch member disposed axially between the first and second input members and coupled to the output member. The device further includes an electromagnet disposed on an opposite side of the second input member relative to the clutch member. In the absence of energizing the electromagnet, the clutch member engages the first input member so that the output member rotates with the first input member. Energizing the electromagnet causes the clutch member to engage the second input member so that the output member rotates with the second input member.

A rotational coupling device in accordance with another embodiment of the invention includes a hub disposed about an axis and an output member supported on the hub for rotation relative to the hub about the axis. The device further includes a first input member disposed about the hub and configured to rotate relative to the hub in a first rotational direction and at a first speed. The device further includes a second input member disposed about the hub and configured to rotate relative to the hub in a second rotational direction and at a second speed. At least one of the second rotational direction and the second speed is different from a corresponding one of the first rotational direction and the first speed. The device further includes a clutch member disposed axially between the first and second input members. The clutch member is coupled to the output member for rotation therewith, but axially movable relative to the output member. The device further includes a spring biasing the clutch member towards the first input member. The device further includes an electromagnet disposed on an opposite side of the second input member relative to the clutch member. In the absence of energizing the electromagnet, the clutch member engages the first input member so that the output member rotates with the first input member. Energizing the electromagnet causes the clutch member to engage the second input member so that the output member rotates with the second input member.

A rotational coupling device in accordance with another embodiment of the invention includes a hub disposed about an axis, a first bearing disposed about the hub and an output member supported on the first bearing for rotation relative to the hub about the axis. The device further includes a second bearing disposed about the output member and a first input member disposed about the hub and supported on the second bearing. The first input member is configured to rotate relative to the hub in a first rotational direction and at a first speed. The device further includes a third bearing disposed about the hub and a second input member disposed about the hub and supported on the third bearing. The second input member is configured to rotate relative to the hub in a second rotational direction and at a second speed. At least one of the second rotational direction and the second speed is different from a corresponding one of the first rotational direction and the first speed. The device further includes a clutch member disposed axially between the first and second input members and coupled to the output member. The device further includes an electromagnet disposed on an opposite side of the second input member relative to the clutch member. In the absence of energizing the electromagnet, the clutch member engages the first input member so that the output member rotates with the first input member. Energizing the electromagnet causes the clutch member to engage the second input member so that the output member rotates with the second input member.

A rotational coupling device in accordance with the present disclosure is advantageous relative to conventional coupling devices. In particular, the disclosed coupling device enables transfer of torque from either of two input members to the output member so that the output member may be driven in different rotational directions and/or at different speeds. When used to drive a cooling fan, for example, the device can result in rotation of the fan in either direction to cool vehicle components and to expel heat or contaminants from the vehicle without the use of an additional motor or similar structure. When used to drive an alternator or other vehicle accessory, for example, the device can drive the alternator or accessory at different speeds during vehicle idling and motion.

The foregoing and other aspects, features, details, utilities, and advantages of the invention will be apparent from reading the following detailed description and claims, and from reviewing the accompanying drawings illustrating features of this invention by way of example.

BRIEF DESCRIPTION OF THE DRAWINGS

FIG. 1 is a cross-sectional view of a rotational coupling device in accordance with the present teachings.

DETAILED DESCRIPTION OF THE INVENTION

Referring now to the drawings wherein like reference numerals are used to identify identical components in the various views, FIG. 1 illustrates a rotational coupling device 10 in accordance with one embodiment of the invention. Device 10 functions as a clutch to selectively transfer torque from an engine, electric motor or other conventional power source. Device 10 also functions as a brake when torque is not being transferred. Device 10 may be provided for use in a vehicle. In one embodiment, device 10 is provided for use in a skid steer loader and, in particular, to control rotation of a cooling fan in the skid steer loader. In another embodiment, device 10 is provided to drive a vehicle alternator or another vehicle accessory at different speeds (e.g., during vehicle idling and motion). It will be understood by those of ordinary skill in the art, however, that device 10 may be used in a wide variety of applications requiring a clutch and/or brake. Device 10 may include a hub 12, an output member 14, bearings 16, 18, 20, input members 22, 24, a clutch member 26, means, such as one or more pins 28 for coupling clutch member 26 to output member 14, means, such as one or more springs 30 for biasing clutch member 26 in one direction, and means, such as electromagnet 32, for urging clutch member 26 in the opposite direction. Device 10 may be provided as a assembled product for use in various applications.

Hub 12 provides structural support for and orients the other components of device 10. Hub 12 may be made from conventional metals and metal alloys. Hub 12 may be disposed about, and centered about, an axis 34 that serves as a rotational axis for various components of device 10. In the illustrated embodiment, hub 12 includes two members 36, 38 that are generally circular in cross section with member 38 disposed about member 36 intermediate the axial ends of member 36. It should be understood, however, that hub 12 may alternatively comprise a unitary structure. Member 36 may define an axially extending through bore 40 configured to receive a fastener 42 such as a bolt through which hub 12 may be secured to a stationary structure and fixed against rotation. In accordance with one aspect of the disclosed embodiment, final assembly of device 10 may be accomplished using a single fastener 42. Member 38 is disposed axially between bearings 16 and 18 and is configured to retain and position bearings 16, 18. A spacer 44 may be disposed between the head of fastener 42 and one end of member 36 and may define a shoulder opposite member 38 to retain and position bearing 18 on hub 12. Similarly, electromagnet 32 may define a shoulder opposite member 38 to retain and position bearing 16 on hub 12. In accordance with one aspect of the disclosed embodiment, hub 12 eliminates the need for brackets or other supporting structure for the other components of device 10.

Output member 14 is provided to transfer torque to a driven device such as a cooling fan in a vehicle cooling system or to a vehicle alternator or another accessory. Member 14 may be made from conventional metals and metal alloys. Member 14 may be disposed about, and centered about, axis 34. Member 14 is disposed at one end of hub 12 and is supported on hub 12 for rotation relative to hub 12 about axis 34 by bearing 18. Member 14 may define a plurality of threaded bores 46 in one axial end of member 14 configured to receive pins 28 for a purpose described below. In the illustrated embodiment, member 14 is coupled to a fan coupling 48 and defines one or more bores 50 formed in an opposite axial end of member 14 that are configured to receive fasteners 52 that couple output member 14 and coupling 48. It should be understood that member 14 and coupling 48 could alternatively be formed as a unitary structure. Further, it should be understood that member 14 could be formed as, or coupled to, a shaft, gear, pulley or other mechanism through which torque may be transferred to a driven device. Member 14 may be shaped to define one or more shoulders used to retain and position bearings 18, 20. In the illustrated embodiment, member 14 defines radially inner and outer shoulders at one axial end that oppose corresponding shoulders formed in coupling 46.

Bearings 16, 18, 20 are provided to support members of device 10 and to allow rotation of members of device 10 relative to other members of device 10. Bearings 16, 18, 20 may comprise roller bearings or another conventional bearing. Bearing 16 is disposed proximate on end of hub 12 and disposed radially between hub 12 and input member 24 thereby permitting input member 24 to rotate relative to hub 12. Bearing 18 is axially spaced from bearing 16 and is disposed proximate the opposite end of hub 12. Bearing 18 is disposed radially between hub 12 and output member 14 thereby permitting output member 14 to rotate relative to hub 12. Bearing 20 is disposed radially between output member 14 and input member 22 thereby permitting input member 22 to rotate relative to output member 14. Bearings 18, 20 may be radially aligned with bearing 20 disposed radially outwardly of bearing 18. In accordance with one advantage of disclosed embodiment, loads resulting from engagement of clutch member 26 with input member 22 may be shared among bearings 18, 20, without any load on bearing 16, and axial loads may be accommodated without the use of a thrust bearing. Similarly, loads resulting from engagement of clutch member 26 with input member 24 are shared among bearings 16, 18, 20. The axially spaced arrangement of bearings 16, 18 and the location of bearing 18 proximate the interface of output member 14 and the fan or other driven device also reduces loads on bearing 16 resulting from the cantilevered position of the driven device.

Input member 22 is provided to transfer torque from a driving member to output member 14 and, as a result, a driven device. Input member 22 may comprise a pulley driven by a belt coupled to an engine or another source of torque. In one embodiment, member 22 is driven by an engine accessory belt. Member 22 is disposed about hub 12 and is configured to rotate in one rotational direction and at one rotational speed. Member 12 may be supported on output member 14 by bearing 20 and may be disposed radially outwardly of output member 14. Member 22 may be centered about, and configured for rotation about, axis 34. In accordance with one aspect of the present teachings discussed in more detail below, member 22 may define a tapered engagement surface 54 configured for engagement with clutch member 26.

Input member 24 is also provided to transfer torque from a driving member to output member 14 and, as a result, a driven device. Input member 24 may likewise comprise a pulley driven by a belt coupled to an engine or another source of torque. Member 24 is disposed about hub 12 and is also configured to rotate in one rotational direction and at one rotational speed. In accordance with aspects of the present teachings, at least one of the rotational direction and rotational speed of input member 24 may vary relative to the corresponding rotational direction and rotational speed of input member 22 such that members 22, 24 may, for example, rotate in opposite rotational direction and/or at different speeds. Member 24 may be centered about, and configured for rotation about, axis 34. Member 24 may be supported on hub 12 by bearing 16 for rotation relative to hub 12. Member 24 may be made from metals and metal alloys. Member 24 includes a radially extending wall 56 and two axially extending, radially spaced walls 58, 60 at either end of wall 56. Walls 58, 60 form radially inner and outer poles and form part of an electromagnetic circuit including electromagnet 32, input member 24 and clutch member 26. Wall 56 defines radially extending, radially spaced surfaces 62, 64 configured for selective frictional engagement with clutch member 26. Wall 56 may include one or more slots 66 configured to guide the path of magnetic flux between electromagnet 32, input member 24 and clutch member 26. These slots 66 may be formed as one or more radially spaced rows of circumferentially spaced, banana shaped slots.

Clutch member 26 is provided to couple output member 14 to either of input members 22, 24 in order to transfer a driving torque from one of input members 22, 24 to output member 14 and drive output member 14 in different rotational directions and/or at different speeds. Clutch member 26 may be annular in shape and may be disposed about, and centered about, axis 34. Member 26 is disposed axially between input members 22, 24. Member 26 may include two portions 68, 70 that are proximate to and adjacent to input members 24, 22, respectively. Portion 68 may be supported on pins 28 extending from output member 14 and may be coupled to output member 14 for rotation with output member 14 through pins 28. Portion 68 defines bores 72 sized to receive pins 28 and springs 30. The diameter of each bore 72 varies to define a spring seat against which one end of a corresponding spring 30 is disposed. Portion 70 is disposed about portion 68 and supports a friction lining 74 on a radially outer surface. In accordance with one aspect of the present teachings, portion 70 of member 26—and particularly friction lining 74 in the illustrated embodiment—tapers and defines a tapered engagement surface 76 configured for engagement with surface 54 in input member 22. The tapered engagement surfaces 54, 76 enable multiplication of the input torque from input member 22. Member 26, and particularly portion 68 of member 26, defines radially extending, radially spaced engagement surfaces 78, 80 at an opposite axial end configured for selective frictional engagement with surfaces 62, 64 in input member 24. When electromagnet 32 is deenergized, clutch member 26 is biased away from input member 24 by springs 30 as discussed hereinbelow creating an air gap 82 between clutch member 26 and input member 24. Portions 68, 70 may be coupled to one another in such a way that the positions of portions 68, 70 relative to one another along axis 34 may be adjusted to modify gap 82 without removing device 10 (or only certain components) from its location within a vehicle or other application environment. The relatively large engagement surfaces 62, 64, 78, 80 of input member 24 and clutch member 26 reduces wear and/or the requirements for any friction materials that may be affixed to input member 24 and clutch member 26 thereby improving the cycle life of device 10.

Pins 28 provides a means for coupling clutch member 26 to output member 14. Pins 28 extend axially from one axial end of output member 14 into clutch member 26. Pins 28 rotate with output member 14 and are fixed against axial movement relative to output member 14. Pins 28 are received within bores 72 of clutch member 26 such that clutch member 26 is coupled for rotation with pins 28 and output member 14, but is axially movable relative to pins 28 and output member 14. Alternatively, a spline or key/keyway engagement could be provided between clutch member 26 and output member 14 to rotatably couple members 14, 26 but allow for axial movement of member 26 relative member 14. Each pin 28 includes a head 84 and a shank 86. Head 84 is disposed at one longitudinal end of pin 28 and defines a spring seat for spring 30. Shank 86 extends axially from head 84 and terminates in a threaded portion configured to be received within bore 46 in output member 14.

Springs 30 provide a means for biasing clutch member 26 in one direction (to the right in FIG. 1). Each springs 30 is disposed about a shank 86 of a corresponding pin 28 between spring seats formed in the head 84 of pin 28 and a shoulder formed by the reduction in diameter in bore 72. Because the axial position of pin 28 is fixed relative to output member 14, spring 30 urges clutch member 26 towards input member 22 to rotatably couple input member 22 to output member 14 and drive output member 14 in one rotational direction.

Electromagnet 32 provides a means for urging clutch member 26 in one axial direction in order to disengage clutch member 26 from input member 22 and engage input member 24. Electromagnet 32 is supported on hub 12 and is disposed on an opposite side of input member 24 relative to clutch member 26. Electromagnet 32 is disposed about, and may be centered about, axis 34. Electromagnet 32 includes a field shell 88 and a conductor 90. Field shell 88 may be annular in shape with an inner diameter sized to receive hub 12 such that field shell 88 is supported on hub 12. Field shell 88 includes a radially extending wall 92 and two radially spaced, axially extending walls 94, 96 that together define a recess configured to receive conductor 90. Walls 94, 96 also form radially inner and outer poles and form part of an electromagnetic circuit including electromagnet 32, input member 24 and clutch member 26. Walls 94, 96 are radially aligned with and proximate to walls 58, 60 in input member 24. Wall 92 may further define a radially outer flange (not shown) configured to receive one or more fasteners such that wall 92 functions as a bracket used to mount device 10 to another structure. Conductor 90 is provided to create an electromagnetic circuit among field shell 88, input member 24 and clutch member 26 in order to cause clutch member 26 to move in one axial direction (to the left in FIG. 1) and into frictional engagement with input member 24 in order to couple output member 14 to input member 24 for rotation therewith. Conductor 90 may comprise a conventional copper coil although other conventional conductors may alternatively be used. Conductor 90 is disposed within field shell 88 radially between walls 94, 96. Leads from conductor 90 may be routed through openings in field shell 88 for connection to a power source and to a grounding member 98 into which fastener 42 may be inserted. In this manner, the leads are located in a stationary component and away from rotating components including the driven device coupled to output member 14 and the driving devices (e.g., belts) coupled to input members 22, 24.

In operation, in the absence of energizing electromagnet 32, springs 30 urge clutch member 26 in one axial direction (to the right in FIG. 1) and into engagement with input member 22 to couple clutch member 26—and, as a result, output member 14—to input member 22 for rotation therewith. In this manner, output member 14 may be driven in one rotational direction and/or at one rotational speed. In one potential application, output member 14 may be coupled to a cooling fan in a vehicle and the rotational coupling of output member 14 with input member 22 drives the fan to provide cooling to vehicle system components. In another potential application, output member 14 may be coupled to an alternator or other vehicle accessory and the rotational coupling of output member 14 with input member 22 drives the alternator or accessory at a first speed. When electromagnet 32 is energized, an electromagnetic circuit is formed between field shell 88, input member 24, and clutch member 26. This circuit urges clutch member 26 in an opposite axial direction (to the left in FIG. 1)—overcoming the biasing force of spring 30—and into engagement with input member 24 to couple clutch member 26—and, as a result, output member 14—to input member 24 for rotation therewith. In this manner, output member 14 may be driven in a different rotational direction and/or at a different speed. In one potential application, the rotational coupling of output member 14 with input member 24 enables reverse rotation of a cooling fan to expel heat from a vehicle and/or contaminants from the radiator in a vehicle. In another potential application, the rotational coupling of output member 14 with input member 24 enables device 10 to drive an alternator or another vehicle at a different speed.

A rotational coupling device 10 in accordance with the present disclosure is advantageous relative to conventional coupling devices. In particular, the disclosed coupling device enables transfer of torque from either of two input members 22, 24 to the output member 14 so that the output member 14 may be driven in different rotational directions and/or at different speeds. When used to drive a cooling fan, for example, the device 10 can result in rotation of the fan in either direction to cool vehicle components and to expel heat or contaminants from the vehicle without the use of an additional motor or similar structure. When used to drive an alternator or other vehicle accessory, for example, the device 10 can drive the alternator or accessory at different speeds during vehicle idling and motion.

While the invention has been shown and described with reference to one or more particular embodiments thereof, it will be understood by those of skill in the art that various changes and modifications can be made without departing from the spirit and scope of the invention.

What is claimed is:

1. A rotational coupling device, comprising:
   a hub disposed about an axis;
   an output member disposed radially outwardly of said hub such that said hub and said output member are disposed in a first common plane perpendicular to said axis, said output member supported on said hub for rotation relative to said hub about said axis;
   a first input member disposed radially outwardly of said hub such that said hub and said first input member are disposed in a second common plane perpendicular to said axis, said first input member configured to rotate relative to said hub in a first rotational direction and at a first speed;
   a second input member disposed radially outwardly of said hub such that said hub and said second input member are disposed in a third common plane perpendicular to said axis, said second input member configured to rotate relative to said hub in a second rotational direction and at a second speed, at least one of said second rotational direction and said second speed different than a corresponding one of said first rotational direction and said first speed;
   a clutch member disposed axially between said first and second input members and coupled to said output member; and,
   an electromagnet disposed on an opposite side of said second input member relative to said clutch member;
   wherein, in the absence of energizing said electromagnet, said clutch member engages said first input member so that said output member rotates with said first input member and energizing said electromagnet causes said clutch member to engage said second input member so that said output member rotates with said second input member.

2. The rotational coupling device of claim 1, wherein said clutch member is coupled to said output member for rotation therewith, but is axially movable relative to said output member.

3. The rotational coupling device of claim 1, further comprising a first bearing disposed between said output member and said first input member.

4. The rotational coupling device of claim 3, further comprising a second bearing disposed between said hub and said output member.

5. The rotational coupling device of claim 4 wherein said first and second bearings are radially aligned.

6. The rotational coupling device of claim 1, further comprising a bearing disposed between said hub and said second input member.

7. The rotational coupling device of claim 1 wherein said hub is fixed against rotation.

8. The rotational coupling device of claim 1 wherein said first input member is supported on said output member.

9. The rotational coupling device of claim 1 wherein said first input member comprises a pulley.

10. The rotational coupling device of claim 1 wherein said second input member comprises a pulley.

11. The rotational coupling device of claim 1 wherein said clutch member includes a tapered engagement surface configured for engagement with a tapered engagement surface in said first input member.

12. The rotational coupling device of claim 1 wherein said electromagnet includes
    a field shell supported on said hub; and,
    a conductor disposed within said field shell.

13. The rotational coupling device of claim 1 wherein said clutch member includes:
    a first portion adjacent said first input member; and,
    a second portion adjacent said second input member;
    wherein the position of said first portion relative to said second portion along said axis is adjustable to thereby modify a gap between said clutch member and said second input member.

14. A rotational coupling device, comprising:
    a hub disposed about an axis;
    an output member disposed radially outwardly of said hub such that said hub and said output member are disposed in a first common plane perpendicular to said axis, said output member supported on said hub for rotation relative to said hub about said axis;

a first input member disposed radially outwardly of said hub such that said hub and said first input member are disposed in a second common plane perpendicular to said axis, said first input member configured to rotate relative to said hub in a first rotational direction and at a first speed;

a second input member disposed radially outwardly of said hub such that said hub and said second input member are disposed in a third common plane perpendicular to said axis, said second input member configured to rotate relative to said hub in a second rotational direction and at a second speed, at least one of said second rotational direction and said second speed different than a corresponding one of said first rotational direction and said first speed;

a clutch member disposed axially between said first and second input members, said clutch member coupled to said output member for rotation therewith, but axially movable relative to said output member;

one or more springs biasing said clutch member towards said first input member; and, an electromagnet disposed on an opposite side of said second input member relative to said clutch member;

wherein, in the absence of energizing said electromagnet, said one or more springs force said clutch member to engage said first input member so that said output member rotates with said first input member and energizing said electromagnet causes said clutch member to engage said second input member so that said output member rotates with said second input member.

15. The rotational coupling device of claim 14, further comprising a pin extending from said output member and supporting said clutch member, wherein a first spring of said one or more springs is disposed between a head of said pin and a surface of said clutch member.

16. The rotational coupling device of claim 14, further comprising:
a first bearing disposed between said hub and said output member; and,
a second bearing disposed between said output member and said first input member.

17. The rotational coupling device of claim 14 wherein said clutch member includes a tapered engagement surface configured for engagement with a tapered engagement surface in said first input member.

18. A rotational coupling device, comprising:
a hub disposed about an axis;
a first bearing disposed about said hub;
an output member supported on said first bearing for rotation relative to said hub about said axis;
a second bearing disposed about said output member;
a first input member disposed about said hub and supported on said second bearing, said first input member configured to rotate relative to said hub in a first rotational direction and at a first speed;
a third bearing disposed about said hub;
a second input member disposed about said hub and supported on said third bearing, said second input member configured to rotate relative to said hub in a second rotational direction and at a second speed, at least one of said second rotational direction and said second speed different than a corresponding one of said first rotational direction and said first speed;
a clutch member disposed axially between said first and second input members and coupled to said output member; and,
an electromagnet disposed on an opposite side of said second input member relative to said clutch member;
wherein, in the absence of energizing said electromagnet, said clutch member engages said first input member so that said output member rotates with said first input member and energizing said electromagnet causes said clutch member to engage said second input member so that said output member rotates with said second input member.

19. The rotational coupling device of claim 18 wherein said first and second bearings are radially aligned.

20. The rotational coupling device of claim 18, further comprising:
a pin extending from said output member into said clutch member, said clutch member axially movable relative to said pin; and,
a spring disposed about said pin and biasing said clutch member towards said first input member.

21. The rotational coupling device of claim 18 wherein said clutch member includes a tapered engagement surface configured for engagement with a tapered engagement surface in said first input member.

22. The rotational coupling device of claim 18 wherein said first bearing is disposed on said hub, said second bearing is disposed on said output member and said third bearing is disposed on said hub.

23. The rotational coupling device of claim 14 wherein a first spring of said one or more springs comprises a compression spring.

24. The rotational coupling device of claim 14 wherein a first spring of said one or more springs is disposed on a side of said clutch member opposite said first input member.

25. The rotational coupling device of claim 14 wherein said one or more springs provide the only force biasing said clutch member towards said first input member.

26. The rotational coupling device of claim 1 wherein at least a portion of said output member is disposed on an opposite side of said clutch member relative to said electromagnet.

27. The rotational coupling device of claim 18 wherein at least a portion of said output member is disposed on an opposite side of said clutch member relative to said electromagnet.

* * * * *